United States Patent
Woodward

(10) Patent No.: US 6,754,627 B2
(45) Date of Patent: Jun. 22, 2004

(54) DETECTING SPEECH RECOGNITION ERRORS IN AN EMBEDDED SPEECH RECOGNITION SYSTEM

(75) Inventor: Steven G. Woodward, Boca Raton, FL (US)

(73) Assignee: International Business Machines Corporation, Armonk, NY (US)

(*) Notice: Subject to any disclaimer, the term of this patent is extended or adjusted under 35 U.S.C. 154(b) by 466 days.

(21) Appl. No.: 09/798,658

(22) Filed: Mar. 1, 2001

(65) Prior Publication Data

US 2002/0123892 A1 Sep. 5, 2002

(51) Int. Cl.[7] .......................... G10L 15/06; G10L 15/22
(52) U.S. Cl. .................. 704/235; 704/231; 704/251; 704/244
(58) Field of Search .......................... 704/285, 270, 704/270.1, 275, 244, 257, 251, 260, 243; 382/100

(56) References Cited

U.S. PATENT DOCUMENTS

| | | | | |
|---|---|---|---|---|
| 4,866,778 A | * | 9/1989 | Baker | 704/251 |
| 5,606,644 A | * | 2/1997 | Chou et al. | 704/243 |
| 5,689,617 A | * | 11/1997 | Pallakoff et al. | 704/255 |
| 6,064,961 A | * | 5/2000 | Hanson | 704/260 |
| 6,138,099 A | * | 10/2000 | Lewis et al. | 704/257 |
| 6,185,535 B1 | * | 2/2001 | Hedin et al. | 704/275 |
| 6,219,643 B1 | * | 4/2001 | Cohen et al. | 704/257 |
| 6,243,481 B1 | * | 6/2001 | Tao | 382/100 |
| 6,587,824 B1 | * | 7/2003 | Everhart et al. | 704/275 |

FOREIGN PATENT DOCUMENTS

| | | | | |
|---|---|---|---|---|
| EP | | 635820 A | * 2/1997 | G10L/5/06 |

OTHER PUBLICATIONS

Khan (Neufuz: The Integration of Fuzzy Logic and Neural Nets Offers Designers Tremendous Application Advantage—Today WESCON/'93 Conference Record, Sep. 1993).*

"IEEE 100" The Authoritative Dictionary of IEEE Standards Terms, 7th edition, IEEE Press, © 2000.*

* cited by examiner

*Primary Examiner*—Richemond Dorvil
*Assistant Examiner*—Daniel A. Nolan
(74) *Attorney, Agent, or Firm*—Akerman Senterfitt

(57) ABSTRACT

A method for processing a misrecognition error in an embedded speech recognition system during a speech recognition session can include the step of speech-to-text converting audio input in the embedded speech recognition system based on an active language model. The speech-to-text conversion can produce speech recognized text that can be presented through a user interface. A user-initiated misrecognition error notification can be detected. The audio input and a reference to the active language model can be provided to a speech recognition system training process associated with the embedded speech recognition system.

12 Claims, 4 Drawing Sheets

DETECTING SPEECH RECOGNITION ERRORS IN AN EMBEDDED SPEECH RECOGNITION SYSTEM

CROSS REFERENCE TO RELATED APPLICATIONS (Not Applicable)

STATEMENT REGARDING FEDERALLY SPONSORED RESEARCH OR DEVELOPMENT (Not Applicable)

BACKGROUND OF THE INVENTION

1. Technical Field

This invention relates to the field of embedded speech recognition systems and more particularly to detecting speech recognition errors in an embedded speech recognition system.

2. Description of the Related Art

Speech recognition is the process by which an acoustic signal received by microphone is converted to a set of text words by a computer. These recognized words may then be used in a variety of computer software applications for purposes such as document preparation, data entry, and command and control. Speech recognition systems programmed or trained to the diction and inflection of a single person can successfully recognize the vast majority of words spoken by that person.

In operation, speech recognition systems can model and classify acoustic signals to form acoustic models, which are representations of basic linguistic units referred to as phonemes. Upon receipt of the acoustic signal, the speech recognition system can analyze the acoustic signal, identify a series of acoustic models within the acoustic signal and derive a list of potential word candidates for the given series of acoustic models. Subsequently, the speech recognition system can contextually analyze the potential word candidates using a language model as a guide.

The task of the language model is to express restrictions imposed on the manner in which words can be combined to form sentences. The language model can express the likelihood of a word appearing immediately adjacent to another word or words. Language models used within speech recognition systems typically are statistical models. Examples of well-known language models suitable for use in speech recognition systems include uniform language models, finite state language models, grammar based language models, and m-gram language models.

Notably, the accuracy of a speech recognition system can improve as word combination statistics collected in a language model are refined during the operation of the speech recognition system. That is, the speech recognition system can observe speech dictation as it occurs and can modify the language model statistics in the language model as correct combinations of words are observed. In consequence, when a misrecognition occurs, it is important to update the language model in order to properly reflect an accurate combination of words as specified by the user. In order to update the language model, however, generally the user first must inform the speech recognition system that a misrecognition has occurred.

In an embedded computer system, typical personal computing peripherals such as a keyboard, mouse, display and graphical user interface (GUI) often do not exist. As such, the lack of a conventional mechanism for interacting with a user can inhibit effective user interaction with an embedded computer system. This problem can become exacerbated where a speech recognition system is an operational component of an embedded computer system. In particular, without an effective mechanism for notifying a speech recognition system when a misrecognition has occurred, the speech recognition system cannot appropriately update the corresponding speech recognition system language model so as to reduce future misrecognitions.

SUMMARY OF THE INVENTION

An embedded speech recognition system in accordance with the inventive arrangements can include an embedded computer system; a speech recognition system configured for operation in the embedded computer system; a speech-enabled application for processing text converted in the speech recognition system; and, misrecognition error logic for notifying the speech recognition system when a misrecognition error has occurred. The embedded speech recognition system can further include an activatable error notification button coupled to the embedded computer system, the button triggering the misrecognition error logic when activated. The embedded computer system in the embedded speech recognition system can include a central processing unit (CPU); memory; audio circuitry; and, an audio input device. An audio output device optionally can be included. In addition, the embedded speech recognition system can further include at least one speech recognition language model stored in the memory.

A method for processing a misrecognition error in an embedded speech recognition system during a speech recognition session can include speech-to-text converting audio input in the embedded speech recognition system based on an active language model, the speech-to-text conversion producing speech recognized text; presenting the speech recognized text through a user interface; detecting a user-initiated misrecognition error notification; and, responsive to detecting the error notification, providing the audio input and a reference to the active language model to a speech recognition system training process associated with the embedded speech recognition system.

Importantly, the detecting step can include receiving a hardware-generated notification caused by the activation of an error notification button. Alternatively, the detecting step can include receiving a software-generated notification caused by the receipt of a error notification speech command. An exemplary error notification speech command can include, "Recognition Error" or "Misrecognition". Finally, the providing step can include storing the audio input; storing a reference to the active language model; and, providing the stored audio input and reference to the training process subsequent to the speech recognition session.

BRIEF DESCRIPTION OF THE DRAWINGS

There are presently shown in the drawings embodiments which are presently preferred, it being understood, however, that the invention is not limited to the precise arrangements and instrumentalities shown.

DETAILED DESCRIPTION OF THE INVENTION

The present invention is a system and method for processing a misrecognition error in an embedded speech recognition system during a speech recognition session. The method can include speech-to-text converting audio input in the embedded speech recognition system based on an active language model. The speech-to-text conversion process can produce speech recognized text. The speech-recognized text can be presented to a user through a user interface, for example a graphical display. Subsequently, a user-initiated misrecognition error notification can be detected. More particularly, in one aspect of the present invention, the user upon detecting a misrecognition can activate an error button for example by depressing the button. In another aspect of the present invention, the user can provide the error notification by providing a corresponding speech command. Examples of suitable error notification speech commands can include "Recognition Error" or "Misrecognition". Upon detecting a misrecognition error notification, the audio input and a reference to the active language model can be provided to a speech recognition system training process associated with the embedded speech recognition system.

Figure 1:
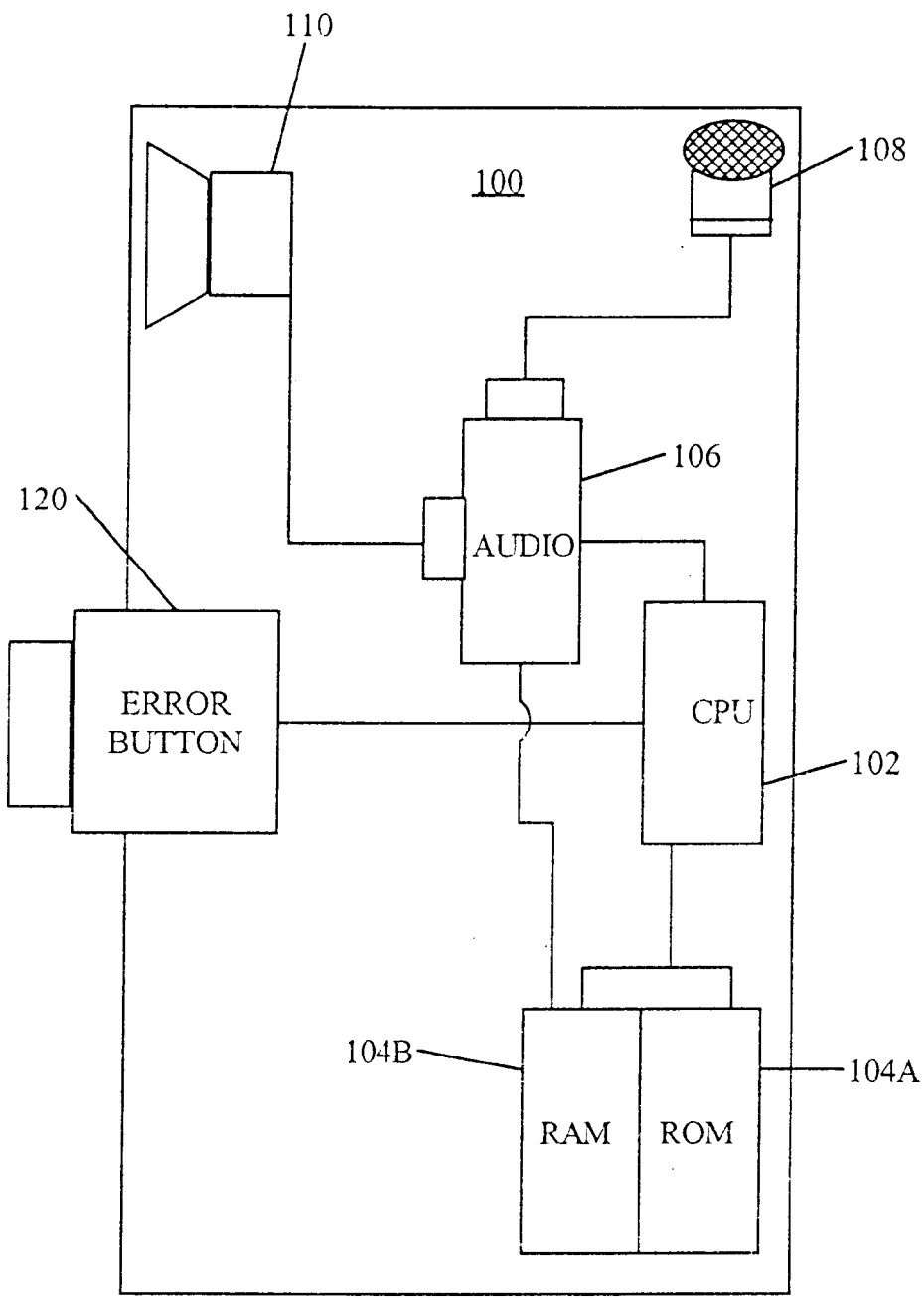
FIG. 1 is a schematic illustration of an embedded computer system configured in accordance with one aspect of the inventive arrangements.

FIG. 1 shows a typical embedded computing device 100 suitable for use with the present invention. The embedded computing device 100 preferably is comprised of a computer including a central processing unit (CPU) 102, one or more memory devices and associated circuitry 104A, 104B. The computing device 100 also can include an audio input device such as a microphone 108 and an audio output device such as a speaker 110, both operatively connected to the computing device through suitable audio interface circuitry 106. The CPU can be comprised of any suitable microprocessor or other electronic processing unit, as is well known to those skilled in the art. Memory devices can include both non-volatile memory 104A and volatile memory 104B. Examples of non-volatile memory can include read-only memory and flash memory. Examples of non-volatile memory can include random access memory (RAM). The audio interface circuitry 106 can be a conventional audio subsystem for converting both analog audio input signals to digital audio data, and also digital audio data to analog audio output signals.

In one aspect of the present invention, an activatable error button 120 can be provided. The error button 120, when activated, can generate a signal which can be interpreted as a notification that a misrecognition has been detected. Notably, the invention is not limited in regard to the process by which the signal can be detected. Rather, any suitable signaling method can suffice, for example a hardware-interrupt method, a software-interrupt method, or conventional messaging.

Figure 2:
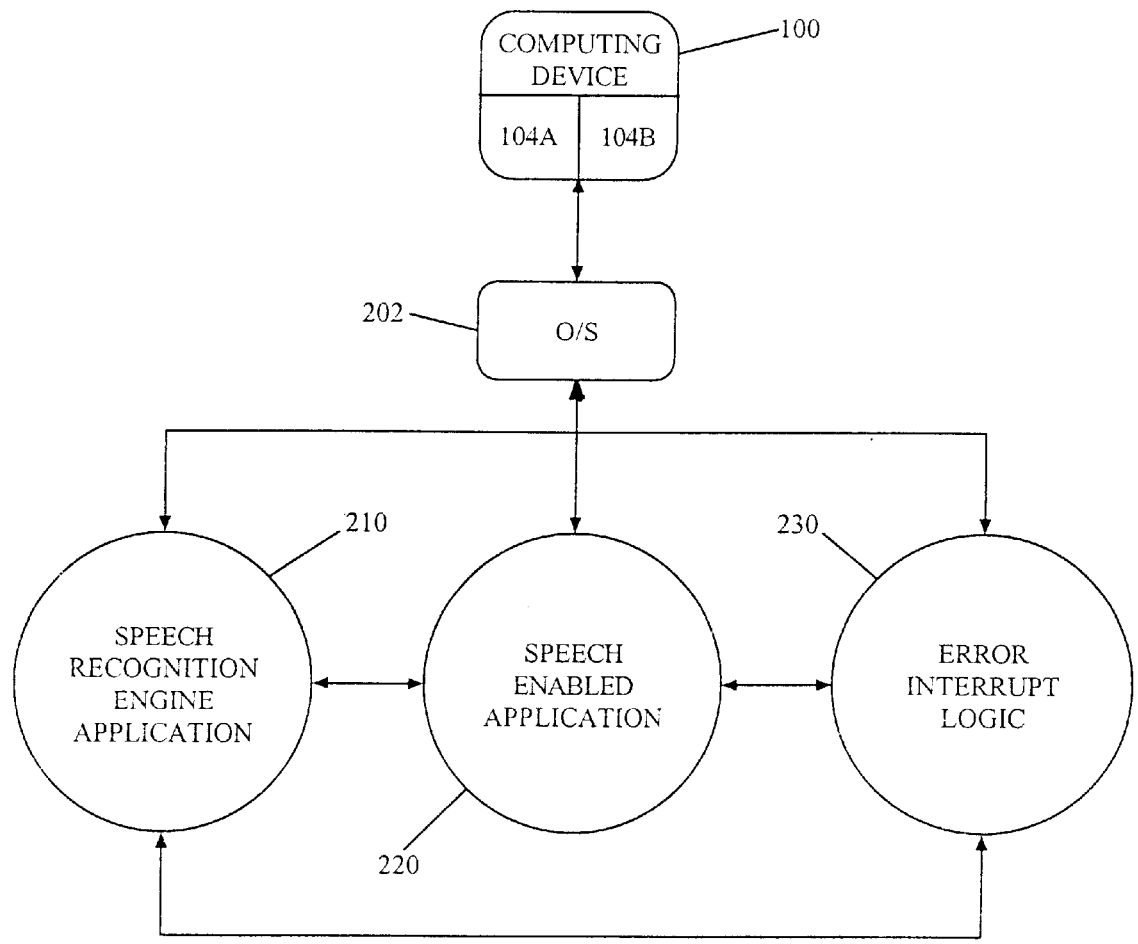
FIG. 2 is a block diagram illustrating an architecture for use in the embedded computer system of FIG. 1.

FIG. 2 illustrates a typical high level architecture for the embedded computing device of FIG. 1. As shown in FIG. 2, an embedded computing device 100 for use with the invention typically can include an operating system 202, a speech recognition engine 210, a speech enabled application 220, and error interrupt logic 230. In FIG. 2, the speech recognition engine 210, speech enabled application 220 and error interrupt logic 230 are shown as separate application programs. It should be noted however that the invention is not limited in this regard, and these various application programs could be implemented as a single, more complex applications program. For example the speech recognition engine 210 could be combined with the speech enabled application 230.

Referring now to both FIGS. 1 and 2, during a speech recognition session, audio signals representative of sound received in microphone 108 are processed by CPU 102 within embedded computing device 100 using audio circuitry 106 so as to be made available to the operating system 202 in digitized form. The audio signals received by the embedded computing device 100 are conventionally provided to the speech recognition engine 210 via the computer operating system 202 in order to perform speech-to-text conversions on the audio signals which can produce speech recognized text. In sum, as in conventional speech recognition systems, the audio signals are processed by the speech recognition engine 210 to identify words spoken by a user into microphone 108.

Once audio signals representative of speech have been converted to speech recognized text by the speech recognition engine 210, the speech recognized text can be provided to the speech enabled application 220 for further processing. Examples of speech enabled applications can include a speech-driven command and control application, or a speech dictation system, although the invention is not limited to a particular type of speech enabled application. The speech enabled application, in turn, can present the speech recognized text to the user through a user interface. For example, the user interface can be a visual display screen, an LCD panel, a simple array of LEDs, or an audio user interface which can provide audio feedback through speaker 110. In any case, responsive to the presentation of the speech recognized text, a user can determine whether the speech recognition engine 210 has properly speech-to-text converted the user's speech. In the case where the speech recognition engine 210 has improperly converted the user's speech into speech recognized text, a speech misrecognition is said to have occurred.

Importantly, where the user identifies a speech misrecognition, the user can notify the speech recognition engine 210. Specifically, in one aspect of the invention, the user can activate the error button 120. However, the invention is not limited in regard to the particular method of notifying the speech recognition engine 210 of the misrecognition. Rather, other notification methods, such as providing a speech command can suffice. In any event, error interrupt logic 230 can process the user notification of the misrecognition by providing the original audio signal which had been misrecognized, and a reference to the active language model to a training process associated with the speech recognition engine 210. In consequence, the training process can update the language model using the audio signal and the reference to the active language model. Notably, in one aspect of the present invention, the audio signal and reference can be stored for use by the training process after the completion of the speech recognition session.

Figure 3A:
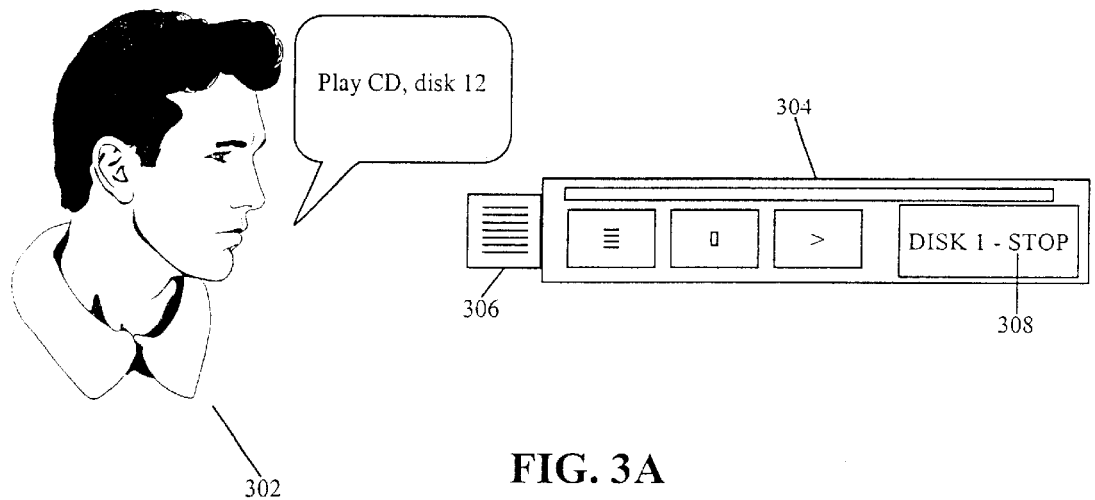
FIGS. 3A and 3B, taken together, are a pictorial illustration showing a process for detecting a speech recognition error in accordance with a second aspect of the inventive arrangements.
Figure 3B:
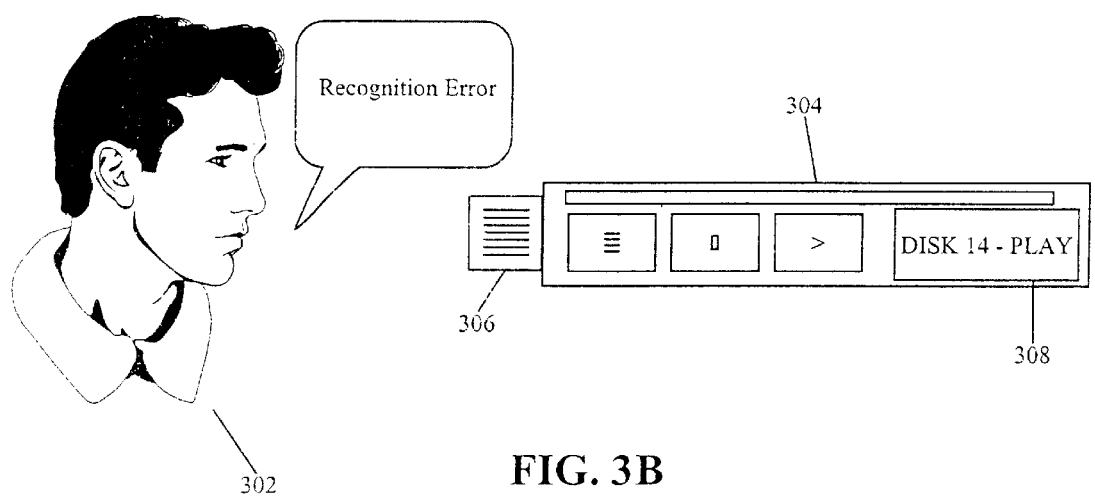

FIGS. 3A and 3B, taken together, are a pictorial illustration depicting an exemplary application of a method for processing a misrecognition error in an embedded speech recognition system during a speech recognition command and control session. Referring first to FIG. 3A, a user 302 can provide a speech command to a speech-enabled car audio system 304 through microphone 306. Specifically, prior to the user 302 providing the speech command, the car audio system 304 can have the first CD in the audio system 304 loaded, but in the stop position as indicated by user interface LCD display 308. Subsequently, the user 302 can say, "Play CD, disk 12" indicating that the car audio system 304 should load the twelfth CD in place of the first CD in the audio system 304 and play back the same.

FIG. 3B depicts the outcome of the user's 302 speech command in addition to the user's 302 response to the outcome. Specifically, audio system 304 can misrecognize the user's 302 command, instead misinterpreting the speech command as "Play CD, disk 14". Moreover, the audio system 304 can display the misrecognized command in the user interface LCD display 308. The user 302, recognizing that a misrecognition has occurred, can notify the speech enabled audio system 304 of the same by providing the speech command, "Recognition Error". Upon receiving this speech command, the audio system 304 can realize that a misrecognition has occurred and that the user's 302 original speech command, "Play CD, Disk 12" should be stored in addition to a reference to the active language model for future training in order to improve the recognition capabilities of the audio system 304.

Figure 4:
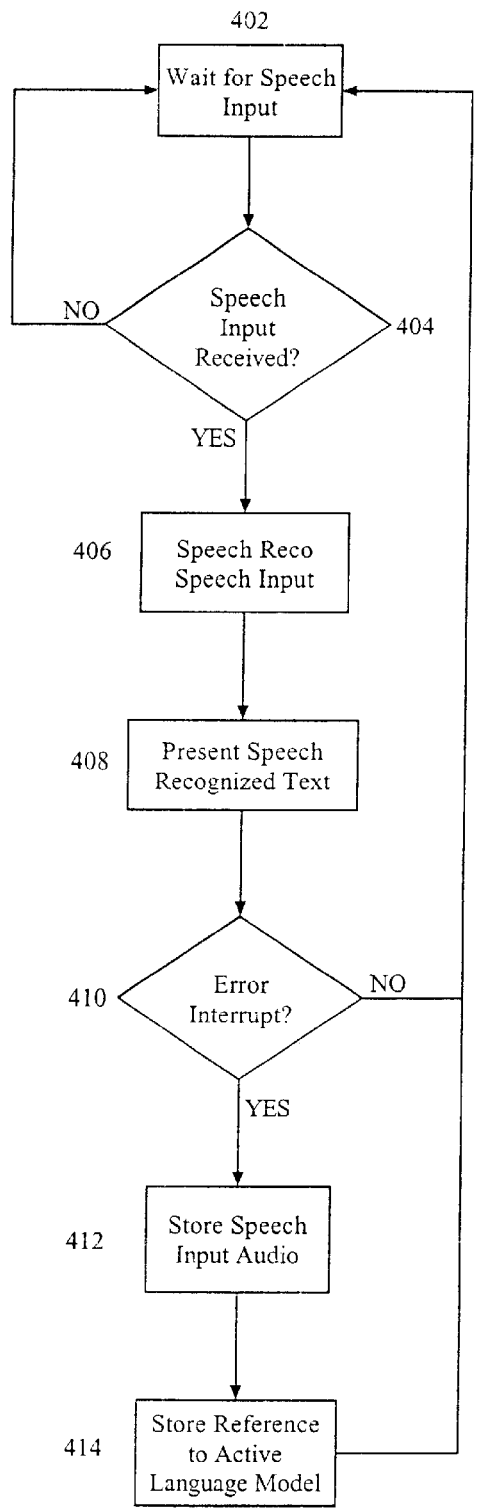
FIG. 4 is a flow chart illustrating a process for handling a detected misrecognition in an embedded computer system.

FIG. 4 is a flow chart illustrating a method for processing a misrecognition error in an embedded speech recognition system during a speech recognition session. The method can begin in step 402 in which a speech-enabled system can await speech input. In step 404, if speech input is not received, the system can continue to await speech input. Otherwise, in step 406 the received speech input can be speech-to-text converted in a speech recognition engine, thereby producing speech recognized text. In step 408, the speech recognized text can be presented through a user interface such as a visual or audio display.

Subsequently, in step 410 if an error notification is not received, such notification indicating that a misrecognition has been identified, it can be assumed that the speech recognition engine correctly recognized the speech input. As such, the method can return to step 402 in which the system can await further speech input. In contrast, if an error notification is received, indicating that a misrecognition has been identified, in step 412 the misrecognized speech input can be stored. Moreover, in step 414 a reference to the active language model at the time of misrecognition can be stored. In consequence, at the conclusion of the speech recognition session, both the stored speech input and reference to the active language model can be used by an associated training session to update the language model in order to improve the recognition capabilities of the speech recognition system.

Notably, the present invention can be realized in hardware, software, or a combination of hardware and software. The method of the present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which when loaded in a computer system is able to carry out these methods. Computer program means or computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the foregoing specification illustrates and describes the preferred embodiments of this invention, it is to be understood that the invention is not limited to the precise construction herein disclosed. The invention can be embodied in other specific forms without departing from the spirit or essential attributes. Accordingly, reference should be made to the following claims, rather than to the foregoing specification, as indicating the scope of the invention.

What is claimed is:

1. An embedded speech recognition system comprising:
   an embedded computer system;
   a speech recognition system configured for operation if said embedded computer system;
   a speech-enabled application for processing text converted in said speech recognition system; and,
   misrecognition error logic for notifying said speech recognition system when a misrecognition error has occurred, wherein said misrecognition logic is disposed within said embedded computer system.

2. The embedded speech recognition system of claim 1, further comprising an activatable error notification button coupled to said embedded computer system, said button triggering said misrecognition error logic when activated, wherein said error notification button is an input mechanism explicitly included within said embedded speech recognition system in order to perform said triggering.

3. The embedded speech recognition system of claim 1, wherein said embedded computer system comprises:
   a central processing unit (CPU);
   memory;
   audio circuitry; and,
   an audio input device.

4. The embedded speech recognition system of claim 3, further comprising at least one speech recognition language model wherein said speech recognition language model includes at least one speech command, and wherein said misrecognition logic is triggered responsive to the detection of said speech command within a speech input received via said audio input device.

5. A method for processing a misrecognition error in an embedded speech recognition system during a speech recognition session, comprising:
   speech-to-text converting audio input in the embedded speech recognition system based on an active language model, said speech-to-text conversion producing speech recognized text;
   presenting said speech recognized text through a user interface;
   detecting a user-initiated misrecognition error notification; and,
   responsive to detecting said error notification, providing said audio input and a reference to said active language model to a speech recognition system training process associated with the embedded speech recognition system.

6. The method of claim 5, wherein said detecting step comprises receiving a hardware-generated notification caused by the activation of an error notification button, wherein said error notification button is an input mechanism explicitly included within said embedded speech recognition system in order to generate said notification.

7. The method of claim 5, wherein said detecting step comprises receiving a software-generated notification caused by the receipt of a error notification speech command, wherein said speech command is matched against a previously established error command stored within said embedded speech recognition system.

8. The method of claim 5, wherein said providing step comprises:

storing said audio input;

storing a reference to said active language model; and, providing said stored audio input and reference to said training process subsequent to the speech recognition session.

9. A machine readable storage, having stored thereon a computer program for processing a misrecognition error in an embedded speech recognition system during a speech recognition session, said computer program having a plurality of code sections executable by a machine for causing the machine to perform the steps of:

speech-to-text converting audio input in the embedded speech recognition system based on an active language model, said speech-to-text conversion producing speech recognized text;

presenting said speech recognized text through a user interface;

detecting a user-initiated misrecognition error notification; and, responsive to detecting said error notification, providing said audio input and a reference to said active language model to a speech recognition system training process associated with the embedded speech recognition system.

10. The machine readable storage of claim 9, wherein said detecting step comprises receiving a hardware-generated notification caused by the activation of an error notification button, wherein said error notification button is an input mechanism explicitly included within said embedded speech recognition system in order to generate said notification.

11. The machine readable storage of claim 9, wherein said detecting step comprises receiving a software-generated notification caused by the receipt of a error notification speech command, wherein said speech command is matched against a previously established error command stored within said embedded speech recognition system.

12. The machine readable storage of claim 9, wherein said providing step comprises:

storing said audio input:

storing a reference to said active language model; and, providing said stored audio input and reference to said training process subsequent to the speech recognition session.

* * * * *